United States Patent [19]
Allen

[11] Patent Number: 4,728,794
[45] Date of Patent: Mar. 1, 1988

[54] RADIATION SENSING ARRANGEMENTS

[75] Inventor: Nicholas S. Allen, Windsor, England

[73] Assignee: Graviner Limited, Essex, England

[21] Appl. No.: 866,481

[22] Filed: May 23, 1986

[30] Foreign Application Priority Data

May 28, 1985 [GB] United Kingdom ................ 8513419

[51] Int. Cl.[4] ............................ G01J 5/08; G01J 5/04

[52] U.S. Cl. .................................... 250/339; 250/338; 250/342; 250/349

[58] Field of Search ............... 250/342, 339, 372, 349; 340/578

[56] References Cited

U.S. PATENT DOCUMENTS 3,903,422 9/1975 Buhrer .............................. 250/461.1
3,952,196 4/1976 Larsen ................................ 250/372
4,529,881 7/1985 Ceurvels et al. .................... 250/353
4,560,874 12/1985 Cinzori et al. ...................... 250/339

FOREIGN PATENT DOCUMENTS 0066370 12/1982 European Pat. Off. .
0078443 5/1983 European Pat. Off. .
0079645 5/1983 European Pat. Off. .
1939867 6/1966 Fed. Rep. of Germany .
2833635 2/1980 Fed. Rep. of Germany .
58-182519 10/1983 Japan .................................. 250/342
2141228 12/1984 United Kingdom .

*Primary Examiner*—Janice A. Howell
*Assistant Examiner*—Constantine Hannaher
*Attorney, Agent, or Firm*—Leydig, Voit & Mayer

[57] ABSTRACT

A fire or explosion detection arrangement has a housing with first and second adjacent radiation-transmitting windows. The first window includes a filter having a passband corresponding to a narrow predetermined wavelength band. A radiation sensor mounted within the housing receives radiation from a fire or explosion through the first window, the predetermined passband corresponding to a wavelength band within which a fire or explosion to be detected generates radiation. An external source generates testing radiation having wavelengths capable of passing through the second radiation transmitting window but not through the filter. This radiation is directed to the sensor. There, means (either the sensor itself or, for example, an FET which is provided to process the normal output of the sensor) responds to the level of the testing radiation and a circuit determines from this level whether the obscuration of the second window is excessive. This is used to assess whether the obscuration of the first window is above or below a predetermined level.

27 Claims, 2 Drawing Figures

RADIATION SENSING ARRANGEMENTS

The invention relates to radiation detection systems and more particularly, though not exclusively, to such systems used for detecting fires or explosions by means of the radiation which they emit.

Radiation detection systems employ a suitable radiation detector which is normally mounted behind a "window" through which it views the area to be monitored, and this window may incorporate a radiation filter so as to render the radiation sensor responsive to radiation lying within a specific narrow band. In order for the system to be able to operate correctly, it is clearly necessary to ensure that the window is always sufficiently clean to enable the sensor to pick up the radiation to be detected. Some form of arrangement to enable the cleanliness of the window to be checked is therefore required.

According to the invention, there is provided a method of checking for abscuration of a radiation-transmitting window capable of transmitting radiation from relatively hot sources but not from relatively cold sources and which is used in a radiation detection system incorporating radiation sensing means capable of responding to radiation from relatively hot and from relatively cold sources and arranged to sense radiation passing through the said window, comprising the steps of directing testing radiation to the radiation sensing means from a relatively cold source which is situated on the opposite side of the said window to the radiation sensing means, the path of the testing radiation by-passing the said window but passing adjacent thereto, and monitoring an output signal produced by the radiation sensing means in response to the received testing radiation whereby to access the degree of the said obscuration.

As used in this specification and its claims, the terms "relatively hot source" and "relatively cold source" means a source whose surface or contact temperature is relatively hot or relatively cold respectively.

According to the invention, there is also provided apparatus for checking for obscuration of a radiation-transmitting window capable of transmitting radiation from relatively hot sources but not from relatively cold sources and which is used in a radiation detection system incorporating radiation sensing mean capable of responding to radiation from relatively hot and from relatively cold sources and arranged to sense radiation passing through the said window, comprising a relatively cold source producing testing radiation, means for directing the testing radiation to the radiation sensing means from the opposite side of the said window to the radiation sensing means, the path of the testing radiation by-passing the said window but passing adjacent thereto, and means for monitoring the output signal produced by the radiation sensing means in response to the received testing radiation whereby to access the degree of the said obscuration.

According to the invention, there is further provided a fire or explosion detection arrangement, comprising a housing having first and second adjacent radiation-transmitting windows, the first radiation transmitting window including a radiation transmitting filter having a passband corresponding to a predetermined wavelength band, a radiation sensor mounted within the housing so as to receive radiation from a fire or explosion external to the housing through the first window, the predetermined passband corresponding to a wavelength band within which a fire or explosion to be detected generates radiation, electrical circuitry connected to the radiation sensor and responsive to the said radiation received thereby to produce an output signal accordingly, a source of testing radiation mounted externally of the housing and energisable to generate testing radiation having a wavelength or wavelengths capable of passing through the second transmitting window but not through the first window, means for directing the testing radiation through the second window to the radiation sensor, means responsive to the level of the testing radiation received at the sensor for producing a corresponding electrical signal which is fed through the said electrical processing circuitry, and means responsive to the electrical signal so fed through the electrical processing circuitry to determine whether the level of obscuration of the second window lies above or below a predetermined level, whereby to make an assessment whether the level of obscuration of the first window lies above or below a predetermined level.

A fire detection system embodying the invention will now be described, by way of example only, with reference to the accompanying diagrammatic drawing in which.

Figure 1:
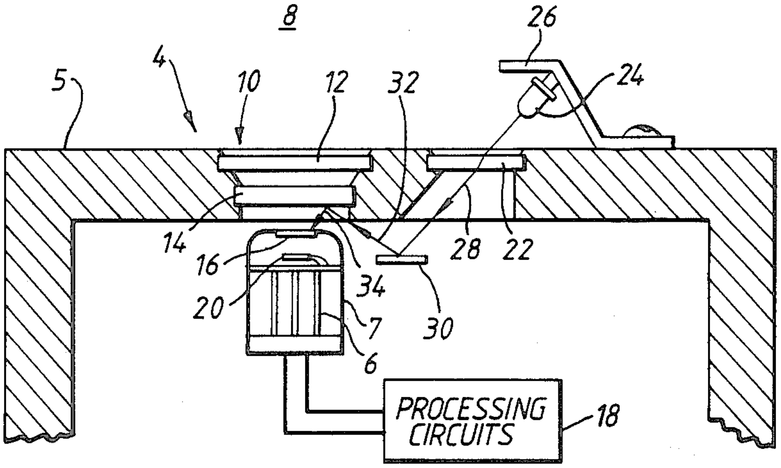
FIG. 1 is a diagrammatic cross-section through the system.

As shown in FIG. 1, the system is in the form of a detector 4 comprising a housing 5 inside which is mounted an infra-red radiation sensor 6 in a can 7. In this example, the sensor 6 is a pyroelectric-type sensor for example. The sensor views an area 8 (the area within which a fire is to be detected) through a window assembly shown generally at 10. The window assembly 10 comprises a sapphire window 12 behind which is mounted a narrow band filter 14 designed to pass radiation within a predetermined narrow wavelength band. The window assembly 10 is completed by a silicon window 16 which in fact is built in to the can 7.

The filter 14 ensures that only radiation within the narrow band centred on 4.4 micrometers reaches the sensor 6. The narrow band centred on 4.4 micrometers is the narrow band in which burning hydrocarbons emit peak radiation, and this ensures that the sensor 6 is rendered highly sensitive to radiation emitted by a hydrocarbon fire and relatively insensitive to radiation emitted by other potentially interfering sources such as solar radiation. The radiation within the narrow band heats the sensor 6 and the resultant electrical signal is fed to a suitable processing circuit shown diagrammatically at 18 via an FET 20 which provides an electrical buffering and impedance matching device. Such an arrangement therefore provides a convenient detecting system for detecting hydrocarbon fires.

It will be appreciated, however, that the efficiency of the detecting system depends on the cleanliness of the window assembly 10. More specifically, dirt on the outside surface of the window 12 will reduce the efficiency of radiation detection until eventually the system becomes too insensitive to be useful. It is therefore necessary to test the cleanliness of the window assembly 10 periodically. However, it is not practicable to test the cleanliness of the window assembly by providing an external source of radiation and directing this through the window assembly 10 on to the sensor 6, and monitoring the response of the latter. This is because any such testing must clearly produce a sufficient amount of radiation within the narrow passband of the filter 14 and this requires the radiation sources to be at a considerable temperature. This is generally unsatisfactory and is completely unacceptable in those cases where certain "intrinsically safe" requirements have to be satisfied. Thus, if the environment within the area 8 has to be maintained intrinsically safe, it is clearly impossible to test the cleanliness of the window assembly 10 in the manner just suggested. Therefore, in order to carry out cleanlines testing, the detector incorporates a second window 22 in the form of a silicon window mounted in the housing 5 immediately adjacent to the window assembly 10. On the outside of the housing 5 is mounted a light emitting diode (LED) 24 behind a protective cover 26. The LED is so positioned that the radiation it emits, when it is suitably electrically energised, passes through the window 22 and passes along a path indicated at 28 to strike the surface of a mirror 30 which is mounted (by means not shown) within the housing 5. The reflected radiation then passes along a path 32 to strike the inner surface of the filter 14 which reflects it along a path 34 so that it passes through the silicon window 16 to the sensor 6 which, in a manner to be explained, is arranged to produce an appropriate electrical response which is fed to the circuitry 18 where its level is monitored. In this way, therefore, the radiation from the LED 24 does not have to pass through the filter 14 in order to reach the sensor 6. The protective cover 26 also acts to block any extraneous radiation which would otherwise follow the same path as the light from the LED 24.

The level of the output produced at the sensor 6 in response to the radiation reaching it from the LED 24 will clearly be dependent on the cleanliness of the window 22. However, because the radiation from the LED 24 passes through the window 22 but not through the window assembly 10, in arrangement will only be effective as a test of the cleanliness of the window assembly 10 if it can be assumed that the state of cleanliness of the window 22 is a sufficient measure of the state of cleanliness of the window assembly 10. Provided that the window 22 is sufficiently close to the window assembly 10, and in the absence of abnormal ambient conditions, it is found that this assumption is correct.

In order for the radiation from the LED 24 to be useful for checking the cleanliness of the window assembly 10, it is of course necessary for the LED to emit radiation at a wavelength and intensity sufficient to cause the sensor to produce a suitable response. The sensor 6 may itself directly produce the electrical output in response to the radiation from the LED 24. However, if the sensor 6 is not itself capable of producing a sufficient response to the radiation received from the LED 24, a supplementary sensor, suitably arranged to be sufficiently response to that radiation received from the LED 24, a supplementary sensor, suitably arranged to be sufficiently responsive to that radiation, may be provided and, for example, incorporated within the can 7. Any such supplementary sensor is arranged to have its output fed through the same circuitry 18 as the main sensor 6. In fact, it is found that the FET 20 itself may be particularly sensitive to radiation between 1 and 1.5 micrometers and is capable of producing an adequately large electrical output to satisfy the requirements for the test.

Figure 2:
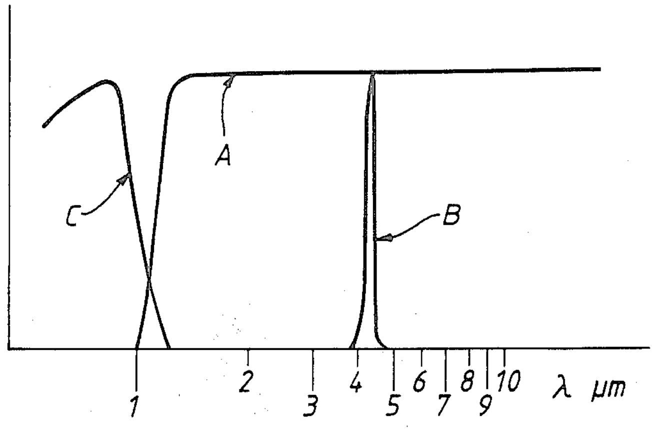
FIG. 2 shows the spectral responses of various parts of the system.

FIG. 2 shows at A the spectral transmission of the silicon windows 16 and 22. The spectral response of the filter 14 is shown at B. Finally, the spectral emission of the LED 24 is shown at C. It will be apparent that the radiation emitted by the LED 24 is incapable of being transmitted through the filter 14 and it thus follows that this radiation could not be used to test the cleaniness of the window assembly 10 by passing the radiation directly through the window assembly. However, the LED 24 does emit a reasonable amount of radiation at about 1.5 micrometers which is thus able to pass through the silicon windows 22 and 16.

An LED is a "cold" emitter of radiation, that is, when electrically energised so as to emit radiation its temperature does not rise significantly and certainly not above the limits laid down by intrinsically safe requirements. Furthermore, the necessary electrical energisation required for the LED also satisfies intrinsically safe requirements.

The processing circuitry 18 can be arranged to be switched into a checking mode as required. For example, the detector may be provided by an operator-controlled check switch. When this is operated, the LED 24 is energised and simultaneously switches the processing circuitry 18 into the checking mode in which it monitors the resultant output from the sensor 6 (or from the FET 20 or any other supplementary sensor provided). If the intensity of the radiation received from the LED 24 is sufficient to indicate adequate cleanliness of the window 22 (and thus of the window assembly 10 as well), an appropriate indication is given. Instead, however, the checking process may be initiated automatically at periodic intervals.

When the sensor 6 is itself arranged to respond to the testing radiation received from the LED 24, it will be apparent that the testing procedure not only checks the cleanliness of the window 22, and thus of the window assembly 10, but also checks the circuitry of the sensor 6 and its circuit connections. If the sensor 6 is not itself used to check the testing radiation from the LED 24, but an auxiliary sensor, also connected to circuitry 18, is used for this purpose (such as the FET 20), it will be apparent that such auxiliary sensor again not only checks the cleanliness of the windows but also the circuitry 18 and its connections.

What is claimed is:

1. A method of checking for obscuration of a radiation-transmitting window capable of transmitting radiation from relatively hot sources but not from relatively cold sources and which is used in a radiation detection system incorporating radiation sensing means capable of responding to radiation from relatively hot and from relatively cold sources and arranged to sense radiation passing through the said window, comprising the steps of directing testing radiation to the radiation sensing means from a relatively cold source which is situated on the opposite side of the said window to the radiation sensing means, the path of the testing radiation by-passing the said window but passing adjacent thereto, and monitoring an output signal produced by the radiation sensing means in response to the received testing radiation so as to assess the degree of the said obscuration.

2. A method according to claim 1, in which the radiation sensing means comprises a single radiation sensor which is responsive both to the radiation from the relatively hot source and to the radiation from the relatively cold source.

3. A method according to claim 1, in which the radiation sensing means comprises two separate but juxtaposed radiation sensors, the first responsive to radiation from the relatively hot source and the second responsive to radiation from the relatively cold source.

4. A method according to claim 1, in which the radiation sensing means produces an electrical signal in response to sensed radiation from the relatively hot source which is processed by electrical processing circuitry to produce a corresponding output signal, and including the step of feeding the output signal produced by the radiation sensing means in response to the received testing radiation through the same electrical processing circuitry to assess the degree of the obscuration.

5. A method according to claim 4, in which the radiation sensing means comprises a radiation sensor responsive only to radiation from the relatively hot source and a field effect transistor which is connected in circuit with the radiation sensor and is part of the said electrical processing circuitry and is responsive to the radiation from the relatively cold source.

6. A method according to claim 1, in which the said path of the testing radiation passes through a second window adjacent to the first-mentioned window and capable of transmitting the testing radiation.

7. A method according to claim 1, including the step of reflecting the testing radiation within the said path.

8. A method according to claim 7, in which the window includes a radiation filter having a passband corresponding to a predetermined wavelength band appropriate to the radiation from the relatively hot sources, and in which the reflecting step comprises reflecting the testing radiation from a surface of the filter.

9. A method according to claim 1, in which the relatively cold source is an intrinsically safe source.

10. Apparatus for checking for obscuration of a radiation-transmitting window capable of transmitting radiation from relatively hot sources but not from relatively cold sources and which is used in a radiation detection system incorporating radiation sensing means capable of responding to radiation from relatively hot and from relatively cold sources and arranged to sense radiation passing through the said window, the apparatus comprising a relatively cold source producing testing radiation, means for directing the testing radiation to the radiation sensing means from the opposite side of the said window to the radiation sensing means, the path of the testing radiation by-passing the said window but passing adjacent thereto, and means for monitoring the output signal produced by the radiation sensing means in response to the received testing radiation so as to assess the degree of the said obscuration.

11. Apparatus according to claim 10, in which the radiation sensing means comprises a single radiation sensor which is responsive both to the radiation from the relatively hot source and to the radiation from the relatively cold source.

12. Apparatus according to claim 10, in which the radiation sensing means comprises two separate but juxtaposed radiation sensors, the first responsive to radiation from the relatively hot source and the second responsive to radiation from the relatively cold source.

13. Apparatus according to claim 10, in which the radiation sensing means produces an electrical signal in response to sensed radiation from the relatively hot source, and including electrical processing circuitry connected to receive the electrical signal and to produce a corresponding output signal, and in which the monitoring means comprises the same said electrical processing circuitry and the output signal produced by the radiation sensing means in response to the received testing radiation is fed through that electrical processing circuitry.

14. Apparatus according to claim 13, in which the radiation sensing means comprises a radiation sensor responsive only to radiation from the relatively hot source and a field effect transistor which is connected in circuit with the first radiation sensor and is part of the said electrical processing circuitry.

15. Apparatus according to claim 10, in which the said path of the testing radiation passes through a second window adjacent to the first-mentioned window and capable of transmitting the testing radiation.

16. Apparatus according to claim 10, in which the testing radiation passes to the radiation sensing means via a path including radiation reflecting means.

17. Apparatus according to claim 16, in which the window includes a radiation filter having a passband corresponding to a predetermined wavelength band appropriate to the radiation from the relatively hot sources, and in which the reflecting means comprises a filter.

18. Apparatus according to claim 10, in which the relatively cold source is an intrinsically safe source.

19. A fire or explosion detection arrangement, comprising a housing having first and second adjacent radiation-transmitting windows, the first radiation transmitting window including a radiation transmitting filter having a passband corresponding to a predetermined wavelength band, a radiation sensor mounted within the housing so as to receive radiation from a fire or explosion external to the housing through the first window, the predetermined passband corresponding to a wavelength band within which a fire or explosion to be detected generates radiation, electrical circuitry connected to the radiation sensor and responsive to the said radiation received thereby to produce an output signal accordingly, a source of testing radiation mounted externally of the housing and energisable to generate testing radiation having a wavelength or wavelengths capable of passing through the second transmitting window but not through the first window, means for directing the testing radiation through the second window to the radiation sensor, means responsive to the level of the testing radiation received at the sensor for producing a corresponding electrical signal which is fed through the said electrical processing circuitry, and means responsive to the electrical signal so fed through the electrical processing circuitry to determine whether the level of obscuration of the second window lies above or below a predetermined level, so as to make an assessment whether the level of obscuration of the first window lies above or below a predetermined level.

20. An arrangement according to claim 19, in which the radiation sensor itself is arranged to be responsive to the testing radiation.

21. An arrangement according to claim 19, comprising an auxiliary sensor mounted immediately to the adjacent radiation sensor for sensing the testing radiation.

22. An arrangement according to claim 21, in which the auxiliary sensor comprises an FET electrically connected to the radiation sensor and forming part of the said electrical processing circuitry.

23. An arrangement according to claim 19, in which the means defining the path for the testing radiation includes radiation reflecting means.

24. An arrangement according to claim 23, in which the reflecting means includes a surfce of the radiation filter means.

25. An arrangement according to claim 19, in which the source of testing radiation is an intrinsically safe source.

26. An arrangement according to claim 19, in which the passband of the filter means comprises a narrow band including 4.4 micrometers.

27. An arrangement according to claim 19, in which the source of testing radiation comprises a light emitting diode emitting radiation between approximately 1 and 1.5 micrometers.

* * * * *